United States Patent
Hu et al.

[11] Patent Number: 5,999,799
[45] Date of Patent: Dec. 7, 1999

[54] AUTO-FINDER AND DISTANCE WARNING METHOD AND APPARATUS FOR A REMOTE CONTROL INPUT DEVICE

[75] Inventors: Albert Hu, Pleasanton; Shen-Yang Chen, Fremont, both of Calif.

[73] Assignee: Samsung Electronics Co., Ltd., Suwon, Rep. of Korea

[21] Appl. No.: 08/638,620

[22] Filed: Apr. 26, 1996

[51] Int. Cl.[6] .................................................. H04B 17/00
[52] U.S. Cl. ..................... 455/67.7; 455/67.7; 455/92; 455/226.4; 455/229; 340/571
[58] Field of Search .................. 455/91, 92, 95, 455/67.1, 67.7, 88, 226.1, 226.4, 228, 229, 352, 353, 355, 421, 462; 340/825.31, 571, 825.69, 825.72

[56] References Cited

U.S. PATENT DOCUMENTS

| | | | |
|---|---|---|---|
| 5,134,708 | 7/1992 | Marui et al. | 455/421 |
| 5,528,230 | 6/1996 | Kim | 340/825.31 |
| 5,686,891 | 11/1997 | Sacca et al. | 340/571 |

FOREIGN PATENT DOCUMENTS 414396  1/1992  Japan .

*Primary Examiner*—Thanh Cong Le
*Assistant Examiner*—Darnell R. Armstrong
*Attorney, Agent, or Firm*—Kenneth L. Sherman, Esq.; Sherman & Sherman; Jeffrey P. Aiello, Esq.

[57] ABSTRACT

A method and apparatus for preventing the loss of a remote control input device used with a stationary device provides the stationary device with a transmitter and a signal generator that generates signals transmitted by the transmitter. The remote control input device communicates wirelessly with the stationary device, and has a wireless signal receiver that receives the signals from the signal generator, and a distance warning circuit. A distance warning output signal is produced by the distance warning circuit when the input device is beyond a specified distance from the stationary device, as a function of the signals received by the wireless signal receiver. The remote control input device also has an indicator that produces a human-perceptible distance warning signal in response to the production of the distance warning output signal by the distance warning circuit. This alerts a person carrying the remote control input device beyond a specified distance from the stationary device that the remote control input device is being moved out of range of the stationary device, and thereby helps to prevent the permanent loss of the remote control input device.

18 Claims, 3 Drawing Sheets

5,999,799

AUTO-FINDER AND DISTANCE WARNING METHOD AND APPARATUS FOR A REMOTE CONTROL INPUT DEVICE

BACKGROUND OF THE INVENTION

1. Field of the Invention

The present invention relates to the field of wireless remote control input devices, and more particularly, to an apparatus and method for preventing the loss of a remote control input device.

2. Description of Related Art

Remote control input devices have become commonplace in the modern world. The remote control input devices normally provide input data or control signals in a wireless fashion to a stationary device. Examples of stationary devices that are used in conjunction with remote control input devices include Video Cassette Recorders (VCRs), televisions, digital satellite systems, personal computers (when used with a wireless keyboard), stereos, etc.

The freedom provided by the wireless communication between the stationary device and the remote control input device, with the mobility of the remote control input device, makes the likelihood of the loss of the remote control input device at some point in time very high. Loss of the remote control input device for any period of time causes an inconvenience for the operator of the stationary device, and if the loss is permanent, a financial cost is exacted on the owner of the stationary device. Also, the remote control input device may be difficult or impossible to replace, thereby making the operation of the stationary device burdensome.

An attempt to prevent loss of a remote control of a television or a VCR was provided by Magnavox. In the Magnavox system, a button located on the VCR or television was depressed by a person desiring to locate a remote controller that was temporarily misplaced. The VCR or television would transmit a signal and the remote control device would respond to that signal by emitting an auditory location signal. A person listening for the sound of the auditory location signal emitted by the remote control would be able to then find the misplaced remote control.

Although such a finding system for a remote control is helpful in locating a temporarily misplaced remote control that is near the stationary device, this solution does not help when the remote control device is beyond the range of the transmitted signal from the stationary device. For example, if the television or VCR were located in the basement of a home, and the remote control input device was placed in a nightstand in the third floor bedroom, it is possible that the location signal transmitted by the stationary device could not be picked up by the distantly located and misplaced remote control device. In other words, the remote control device could be located beyond the range of the transmitted signal.

SUMMARY OF THE INVENTION

There is a need for a method and apparatus to prevent the loss of a remote control input device to account for situations in which the remote control input device may be carried out of range of the signals transmitted from the stationary device.

These and other needs are met by the present invention which provides a remote control input device for wireless input to a stationary device. This input device comprises a wireless signal receiver that receives signals from the stationary device. The remote control input device also has a distance warning circuit that produces a distance warning output signal when the input device is beyond a specified distance from the stationary device, as a function of the signals received by the wireless signal receiver. The remote control input device also comprises an indicator that produces a human-perceptible distance warning signal in response to production of the distance warning output signal by the distance warning circuit.

The use of a distance warning circuit that provides a warning when the input device is moved beyond a specified distance from the stationary device helps to prevent the loss of the remote control input device. When a person carrying the input device begins to move the input device beyond the specified distance from the stationary device, so that the signals cannot be received by the wireless signal receiver of the remote control input device, a distance warning signal will be produced. This alerts the person carrying the input device that the input device is being moved beyond the specified distance from the stationary device, so that an effort to find the remote control using a location signal would not work. In certain embodiments, the distance warning signal may be disabled so that the user can carry the remote control input device beyond the specified distance without hearing the warning signal.

Another aspect of the present invention also satisfies the earlier stated needs by providing a system comprising a stationary device having a transmitter, and a signal generator that generates signals transmitted by the transmitter. The system also comprises a remote control input device that communicates wirelessly with the stationary device. This remote control input device has a wireless signal receiver that receives the signals from the signal generator, and a distance warning circuit that produces a distance warning output signal when the input device is beyond a specified distance from the stationary device, as a function of the signals received by the wireless signal receiver. The remote control input device also has an indicator that produces a human-perceptible distance warning signal in response to production of a distance warning output signal by the distance warning circuit.

Another aspect of the present invention provides a stationary device that receives input signals wirelessly from a remote control input device and is responsive to finding signals to produce a perceptible indication of the location of a remote control input device. The stationary control device comprises a transmitter, a main power switch that actuates the power for the stationary device, and a signal generator. The finding signals are generated by the signal generator in response to the actuation of the main power switch. The transmitter receives the finding signals from the signal generator and transmits the finding signals.

The use of a signal generator that generates finding signals in response to actuation of the main power switch provides an intuitive method of locating the remote control device by simply turning on the main power at the stationary device. A second button would not have to be depressed in such an instance. This embodiment has the advantage of automatically locating the remote control device every time the stationary device is turned on at the stationary device itself, which will be the case if a remote control device is temporarily misplaced.

A still further aspect of the present invention provides a method of preventing the loss of a remote control input device that interacts with the stationary device comprising the steps of: determining when the remote control input device has moved beyond a specified distance from the stationary device, and producing a perceptible warning signal at the remote control input device when the remote control input device is moved beyond a specified distance from the stationary device.

One of the advantages of this method according to the present invention is that the remote control input device will provide a perceptible warning signal as a function of its distance from the stationary device. It does not need to wait for a finding or location signal actuated with the stationary device by a person looking for the remote control device before it emits a warning sound. A person carrying the remote control input device will be warned, according to the method of the present invention, that the person is carrying the remote control input device beyond the specified distance from the stationary device. In certain embodiments, this specified distance is related to the transmission range of the transmitter of the stationary device.

The foregoing and other features, aspects and advantages of the present invention will become more apparent from the following detailed description of the present invention when taken in conjunction with the accompanying drawings.

DETAILED DESCRIPTION OF ILLUSTRATIVE EMBODIMENTS

Figure 1:
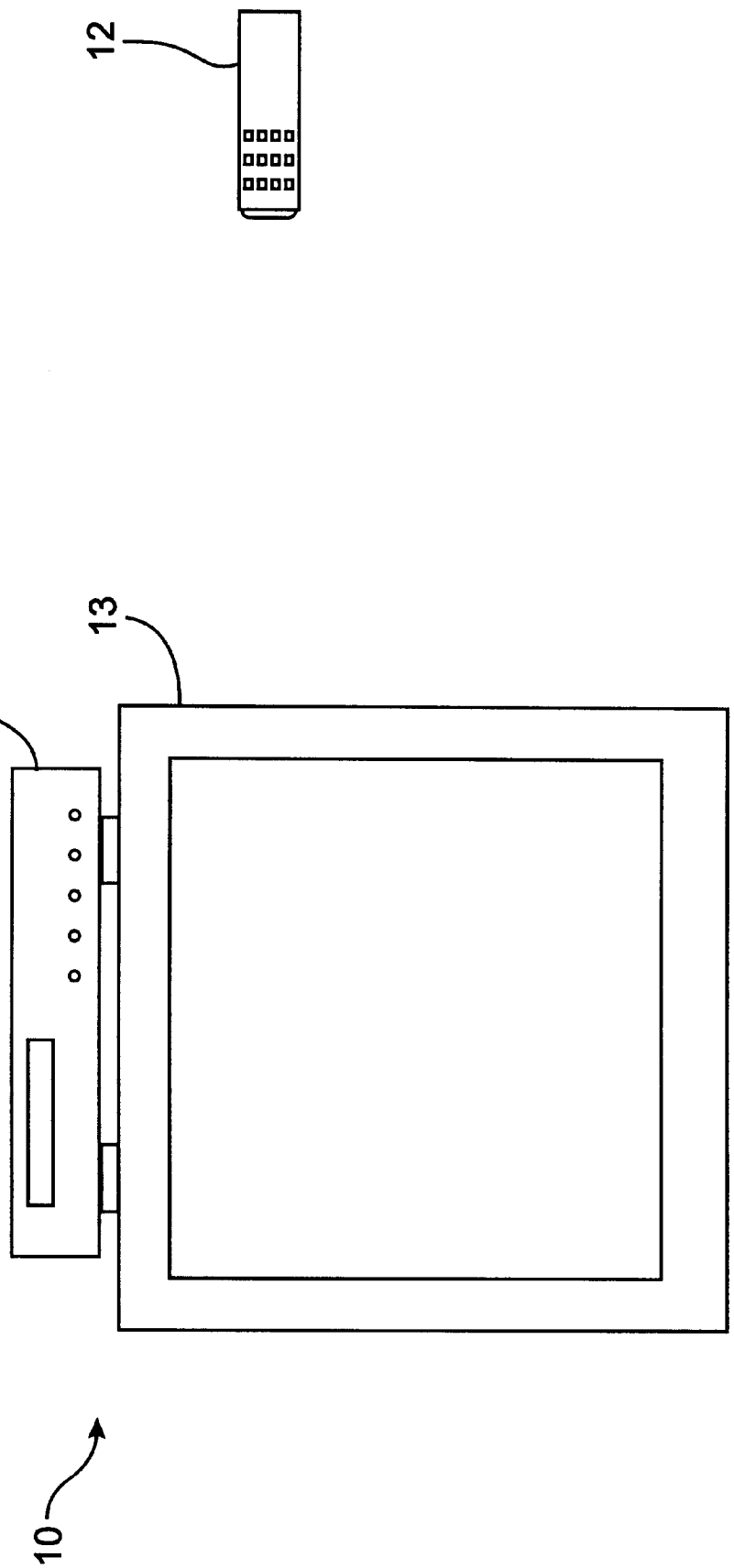
FIG. 1 is a schematic depiction of a stationary device and a remote control input device in a system according to an embodiment of the present invention.

FIG. 1 is a schematic depiction of a system having a stationary device, such as a TV/VCR combination 10 in a remote control input device 12 for operating one or both of the VCR 11 and/or TV 13. In the following described example, the stationary device 10 could be considered to be either the VCR 11 or the TV 13, and the remote control input device 12 is a conventional remote control to operate one of these devices, but modified in the manner described below in accordance with the present invention. However, the present invention is also applicable to other types of stationary devices, such as computers, stereos, etc. The remote control input device may also take other forms than the illustrated embodiment, and may be, for example, a wireless keyboard, an air mouse, etc.

The stationary device 10, for example the VCR 11, includes a transmitter that transmits a signal wirelessly to the remote control input device 12. As an overview of the operation of the present invention, when a locate remote signal switch is actuated at the stationary device 10, a signal will be transmitted by the stationary device 10. If the remote control input device 12 is within a range so that it is able to receive the transmitted finding signals, the remote control input device 12 will produce a perceptible device location signal. This allows someone searching for the remote control input device 12 to locate it. In order to prevent the carrying of the remote control input device 12 to a distance that is beyond the range where it is able to receive the transmitted finding signals from the stationary device 10, the remote control input device 12 emits a human-perceptible distance warning signal when it is beyond the range of the transmitting signals of the stationary device 10. This alerts the person carrying the remote control input device 12 that the remote control input device is being moved beyond the range where the location signal may be received by the remote control input device 12 and therefore increases the possibility of the remote control input device 12 becoming permanently lost.

Figure 2:
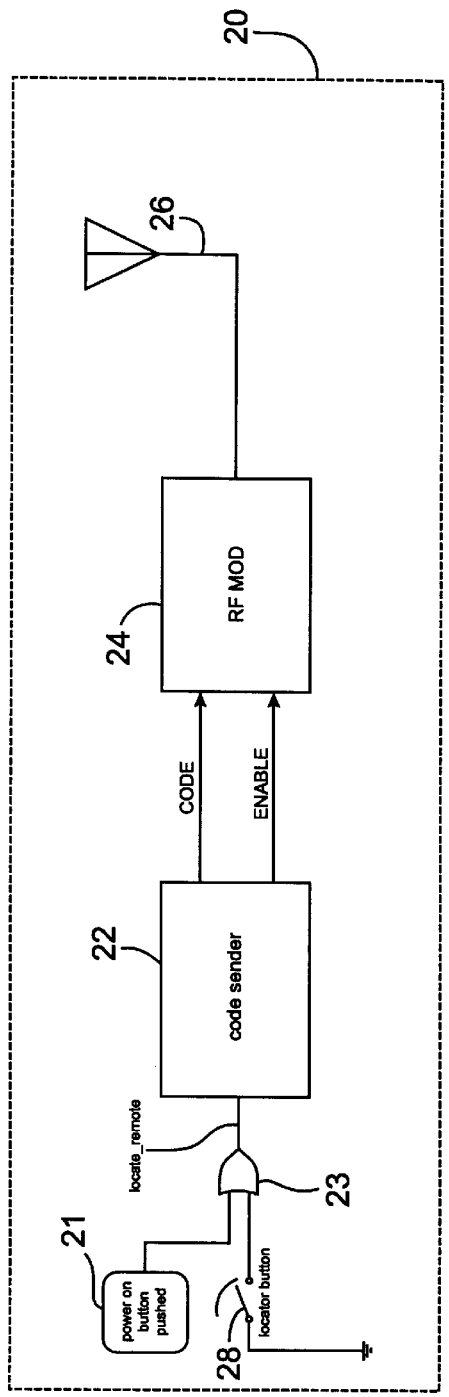
FIG. 2 is a transmitter section of a stationary device constructed in accordance with an embodiment of the present invention.

An embodiment of the transmitter used in the stationary device 10 and constructed in accordance with an embodiment of the present invention is depicted in the block diagram of FIG. 2, and has reference number 20. The transmitter 20 includes the code sender 22 that provides code signals and an enable signal to an RF modulator 24 that is coupled to an antenna 26. The transmitter circuit includes a locate remote signal switch 28, a main power switch 21 for the stationary device 10, and an OR gate 23, as described in more detail later.

Figure 4:
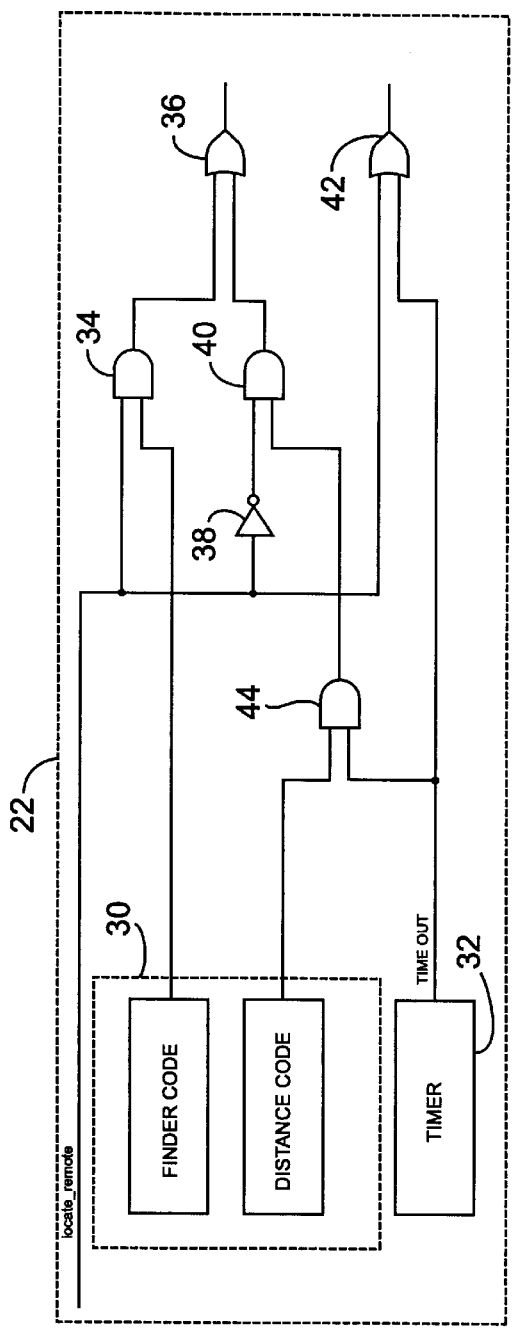
FIG. 4 is a logic diagram of a code sender section of the transmitter of FIG. 2, constructed in accordance with an embodiment of the present invention.

The code sender 22 is depicted in more detail in the block and logic diagram of FIG. 4. The code sender 22 issues two different types of code signals, finding signals and timing signals. The finding signals are coded signals that are transmitted through the stationary device 10 when the user desires to locate the remote control input device 12. When the remote control input device 12 receives the finding signals, it will produce a perceptible signal, auditory and/or visual, that will alert the person searching for the remote control input device 12 to locate it. The other type of coded signal, the timing signal, is produced by the code sender 22 and transmitted to the transmitter 20 periodically. When the remote control input device 12 does not receive one of the periodic timing signals in a specified time period, the remote control input device 12 determines that it is out of range of the stationary device 10 and therefore issues a distance warning signal that is perceptible (auditory and/or visual) to warn the person that the remote control input device 12 is now out of the transmission range of the stationary device 10.

The enable signal is produced by the code sender 22 and received by the RF modulator 24 to control the enablement of the RF modulator 24. In certain embodiments, this produces a power savings, since the RF modulator 24 will be turned on only when the code signals are present and are to be transmitted.

Referring to FIG. 4, the code sender has a memory 30 that contains the finder code from which the finding signals are generated, and a distance code from which the timing signals are generated. In FIG. 4, the memory 30 is hardwired into the logic that produces the code signals. In alternate embodiments, however, a microcontroller is used and controls the retrieval and sending of the codes to the logic. This microcontroller provides programmability of the codes in the memory 30, as well as the timing intervals of the timer 32.

The generation and transmission of a finding signal will now be described. The finder code is provided from the memory 30 to one input of an AND gate 34. The other input of the AND gate 34 is a locate remote signal from the output of the OR gate 23 (FIG. 2) which becomes a logic high upon the actuation of either the locate remote signal switch 28 or the main power switch 21. The logical high signal present at the second input of the AND gate 34 causes the finder code to be provided as an output of the AND gate 34 which forms one input of an OR gate 36. The locate remote signal is also provided to the input of an inverter 38 which inverts the logical high device location signal. Another AND gate 40 receives the now logical low locate remote signal from the inverter 38 so that the output of the AND gate 40 is a logical low. The output of the OR gate 36, which represents the finder code in this instance, forms one of the code signals, i.e., the finding signals.

The finding signals are transmitted by the RF modulator 24 in response to the enablement of the RF modulator by the enable signal generated at the output of OR gate 42. The enable signal will be provided to the RF modulator 24 in response to the locate remote signal being a logical high. Since the RF modulator 24 will only be enabled in response to the device location signal being a logical high (or the timeout signal being a logical high as described later) there is a savings in power consumption.

The finding signals are used by the remote control input device 12 to emit a human-perceptible input device location signal and helps to locate a lost input device 12. However, if the remote control input device 12 is out of the transmission range of the stationary device 10, it will not be able to respond to the finding signals with an input device location signal. In order to alert a person carrying the remote control input device 12 beyond the transmission range of the stationary device 10, timing signals are periodically transmitted to the stationary device 10. The code sender 22 includes a timer 32 that periodically issues a transmission timeout signal at timed intervals. The transmission timeout signal is presented to one input of AND gate 44, which receives the distance code from memory 30 at its other input. The output of the AND gate 44 forms the input of AND gate 40. The other input of AND gate 40 receives the inverted device location signal. During normal operation, the locate remote signal will be a logic low, so that the AND gate 40 will be activated by the transmission timeout signal 32 and the presence of the distance code from AND gate 44. The output of the AND gate 40 forms an input to OR gate 36. The code signals produced by the OR gate 36 from the distance code signals are the timing signals that are transmitted by the RF modulator 24.

The transmission timeout signal generated by the timer 32 forms one input of the OR gate 42. The output of the OR gate 42 is provided as the enable signal for the RF modulator 24.

In normal operation of the stationary device 10, when it is powered on, the distance code is periodically sent out as a code signal, i.e., as a timing signal, in response to the timer 32 timing out at specified time intervals. When the remote control device 12 fails to receive the timing signals transmitted by the stationary device 10, it determines that it is out of range of the stationary device 10 and emits its distance warning signal, as described below.

Figure 3:
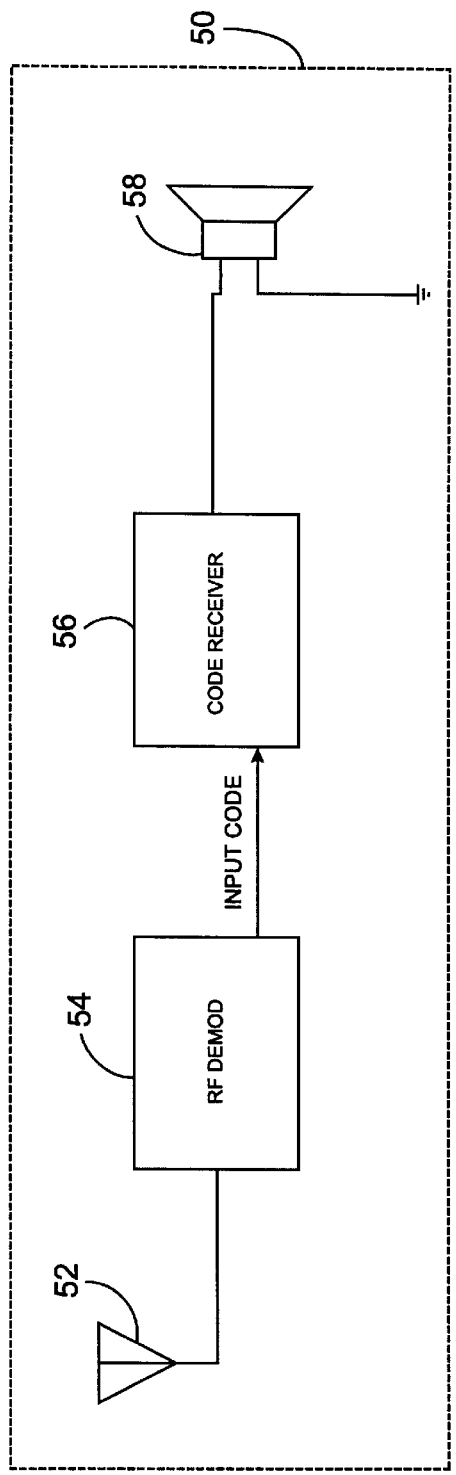
FIG. 3 is a receiver of a remote control input device constructed in accordance with an embodiment of the present invention.

An embodiment of the receiver section 50 of the remote control input device 12 is depicted in the block diagram of FIG. 3. The receiver 50 includes an antenna 52, RF demodulator 54, a code receiver 56 and a speaker (auditory signal generator) 58. In certain embodiments, the speaker is augmented or replaced with a visual indicator, such as a Light Emitting Diode (LED).

Figure 5:
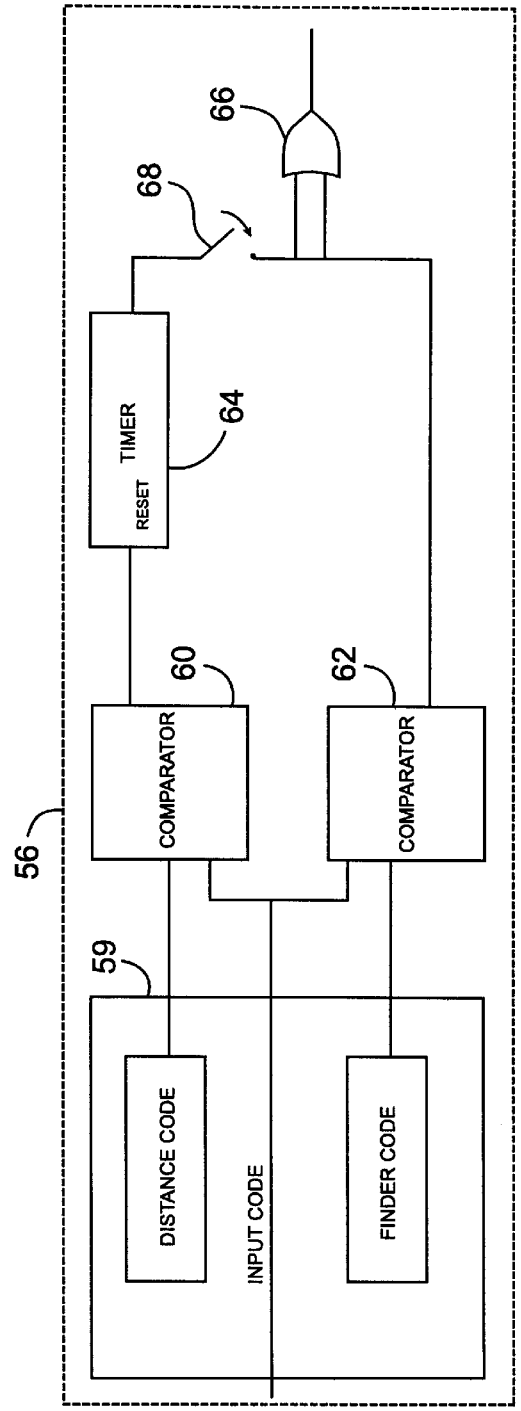
FIG. 5 is a block and logic diagram of a code receiver in the receiver section of FIG. 3, constructed in accordance with an embodiment of the present invention.

A block diagram of the code receiver 56 is depicted in FIG. 5. The input code is provided to the code receiver 56 from the RF demodulator 54. The code receiver 56 has a memory 59 in which the distance code and the finder code are stored. In certain embodiments, this code is programmable, while in other embodiments the codes are permanently set in memory. The input code is compared by a comparator circuit that includes two comparators 60, 62, in certain embodiments. The comparator 62 compares the input code to the finder code stored in memory 59. If there is a match, the comparator 62 generates a finder code match signal which is provided to OR gate 66 which produces the signal as a finder circuit output signal. The finder circuit output signal turns on the speaker 58 (FIG. 3) so that it will produce a human-perceptible input device location signal. Hence, in certain embodiments, the input device location signal is generated upon the actuation of the locate remote signal switch 28 or the main power switch 21 at the stationary device 10, as long as the remote control input device 12 is within transmission range of the transmitter 20 of the stationary device 10.

A distance warning circuit includes the timer 64 that produces a distance warning output signal when the remote control input device is beyond a specified distance from the stationary device 10. The timer 64 is reset when a timing signal containing the distance code is received by the remote control input device 12, as determined by a comparison of the input code with the distance code stored in memory 59 by the comparator 60. If the input code and the distance code match, the comparator 60 generates a distance code match signal as the reset signal for the timer 64. If the timer 64 does not receive the reset signal within a certain specified time, the timer 64 will produce a timeout signal received at an input of the OR gate 66. This is an indication that the remote control input device is out of the transmission range of the stationary device 10. The OR gate 66 produces the timeout signal which now forms the distance warning output signal. The code receiver 56 provides the distance warning output signal to the speaker 58, which produces a human-perceptible distance warning signal in response thereto. A person carrying the remote control input device 12 will therefore be warned that the device 12 is moving beyond, or is currently out of, the transmission range of the transmitter 20 so that it will not be able to respond to any finding signals that are transmitted by the stationary device 10.

In certain embodiments, the specified time for the timer 64 is longer than the time intervals between generation of the transmission timeout signal by the timer 32. In certain preferred embodiments, the specified time is at least twice as long as each time interval.

A circumstance may arise in which it is desirable to move the remote control input device 12 beyond the specified distance from the stationary device 10. In such an instance, it is desirable that the distance warning signal be prevented from sounding. A distance warning enable switch 68 is provided in certain embodiments that enables and disables production of the auditory distance warning signal.

The present invention thus provides a method and apparatus by which the chances of the permanent loss of a remote control input device are greatly reduced, since a person carrying the remote control input device will be aware that it is being moved out of the transmission range of the finding signals transmitted by the stationary device. Also, the use of the main power switch to actuate the locate remote signal in certain embodiments provides a natural and elegant actuation mechanism for the finding function to locate the remote control input device.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A remote control input device for wireless input to a stationary device, the input device comprising:
   a wireless signal receiver that receives signals from a stationary device;
   a distance warning circuit that produces a distance warning output signal when the input device is beyond a specified distance from the stationary device, as a function of the signals received by the wireless signal receiver;
   an indicator that continues to produce a human-perceptible distance warning signal at predetermined intervals in response to production of the distance warning output signal by the distance warning circuit, even when said input device is outside a predetermined region;
   a finder circuit that produces a finder circuit output signal as a function of the signals from the stationary device, the indicator responsive to the finding circuit output signal to produce a human-perceptible input device location signal;
   wherein the signals from the stationary device are code signals that include finding signals and timing signals, the distance warning circuit being responsive to the receipt of the timing signals and the finder circuit being responsive to the receipt of the finding signals;
   wherein the distance warning circuit and the finder circuit comprise a code signal discrimination circuit that discrimination between the signals received by wireless signal receiver; and
   wherein the discrimination circuit includes a storage device in which a distance code and finder code are stored, and a comparator circuit that compares received code signals to the stored distance and finder codes and generates a distance code match signal when the received code signals match the stored distance code, and a finder code match signal when the received code signals match the stored finder code signal, the finder code match signal forming the finder circuit output signal.

2. The input device of claim 1, wherein the distance warning circuit includes a timer coupled to the comparator circuit to receive the distance code match signal as a reset signal, the timer generating a timeout signal when the distance code match signal is not received by the timer within a specified time after a last distance code match signal was received by the timer, the timeout signal forming the distance warning output signal.

3. The input device of claim 2, wherein the indicator is an auditory signal generator coupled to the comparator circuit and the timer and is responsive to the timeout signal to produce the human-perceptible distance warning signal and to the finder code match signal to produce the human-perceptible input device location signal.

4. The input device of claim 3, further comprising a distance warning enable switch that enables and disables the production of the human-perceptible distance warning signal.

5. The input device of claim 1, wherein the transmitter includes a radio frequency (RF)modulator and the wireless signal receiver includes a radio frequency (RF) demodulator.

6. A system comprising:
   a stationary device having:
      a transmitter; and
      a signal generator that generates signals transmitted by the transmitter;
   a remote control input device that communicates wirelessly with the stationary device, the remote control input device having:
      a wireless signal receiver that receives signals from the signal generator;
      a distance warning circuit that produces a distance warning output signal when the input device is beyond a specified distance from the stationary device, as a function of the signals received by the wireless signal receiver;
      an indicator that continuously produces a human-perceptible distance warning signal at predetermined intervals in response to production of the distance warning output signal by the distance warning circuit, even when said remote control input device is outside a predetermined distance from said stationary device;
   wherein the input device further has a finder circuit that produces a finder circuit output signal as a function of the signals from the stationary device, the indicator responsive to the finding circuit output signal to produce a human-perceptible input device location signal;
   wherein the signal generator is a code sender that produces finding signals and timing signals, the finding signals and the timing signals forming the signals transmitted by the transmitter, the distance warning circuit being responsive the receipt of the timing signals and the finder circuit being responsive to the receipt of the finding signals;
   wherein the distance warning circuit and the finder circuit comprise a code signal discrimination circuit that discriminates between the signals received by the wireless signal receiver; and
   wherein the discrimination circuit includes a storage device in which a distance code and a finder code are stored, and a comparator circuit that compares received code signals to the stored distance and finder codes and generates a distance code match signal when the received code signals match the stored distance code, and a finder code match signal when the received code signals match the stored finder code signal, the finder code match signal forming the finder circuit output signal.

7. The system of claim 6, wherein the distance warning circuit includes a timer coupled to the comparator circuit to receive the distance code match signal as a reset signal, the timer generating a timeout signal when the distance code match signal is not received by the timer within a specified time after a last distance code match signal was received by the timer, the timeout signal forming the distance warning output signal.

8. The system of claim 7, wherein the indicator comprises an auditory signal generator coupled to the comparator circuit and the timer and is responsive to the timeout signal to produce the human-perceptible distance warning signal and to the finder code match signal to produce the human-perceptible input device location signal.

9. The system of claim 8, wherein the transmitter includes a radio frequency (RF) modulator and the wireless signal receiver includes a radio frequency (RF) demodulator.

10. The system of claim 9, wherein the input device further has a distance warning enable switch that enables and disables the production of the auditory distance warning signal.

11. The system of claim 6, wherein the code sender includes: a timer that generates a transmission timeout signal at timed intervals; and enable logic that produces an enable signal in response to the generation of the transmission timeout signal, the transmitter being responsive to receipt of the enable signal to transmit the finding signals and the timing signals.

12. The system of claim 11, wherein the stationary device includes a main power switch that controls the enable logic to produce the enable signal.

13. The system of claim 12, wherein the code sender includes selection logic that selects whether the finding signals or the timing signals are provided to the transmitter for transmission, wherein actuation of the device location signal switch controls the selection logic to provide the finding signals to the transmitter, and the transmission timeout signal controls the selection logic to provide the timing signals to the transmitter.

14. The system of claim 13, further comprising a locate remote signal switch that controls with the main power switch the enable logic to produce the enable signal.

15. The system of claim 6, wherein the code sender includes a memory that stores the timing signals and the finding signals.

16. The system of claim 6, wherein the distance warning circuit includes a timer that receives the timing signals and generates a timeout signal when the one of the timing signals is not received by the timer within a specified time after a last one of the timing signals was received, the timeout signal forming the distance warning output signal.

17. The system of claim 16, wherein the specified time is longer than each of the timed intervals.

18. The system of claim 17, wherein the specified time is at least twice as long as each of the timed intervals.

* * * * *